United States Patent
Quinn et al.

(10) Patent No.: US 7,120,234 B1
(45) Date of Patent: Oct. 10, 2006

(54) INTEGRATED TONE-BASED AND VOICE-BASED TELEPHONE USER INTERFACE

(75) Inventors: Eric Rhodes Quinn, Alpharetta, GA (US); Cynthia L. Rennolds, Alpharetta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/473,667

(22) Filed: Dec. 29, 1999

(51) Int. Cl.
*H04M 1/64* (2006.01)

(52) U.S. Cl. .................. 379/88.04; 455/563; 704/275

(58) Field of Classification Search ............ 379/88.04, 379/88.01, 88.03, 88.9, 351, 77; 704/275, 704/200, 251, 270; 455/553.1
See application file for complete search history.

(56) References Cited

U.S. PATENT DOCUMENTS

| | | | |
|---|---|---|---|
| 4,656,651 A | 4/1987 | Evans et al. | |
| 4,943,995 A | 7/1990 | Daudelin et al. | |
| 5,131,045 A | 7/1992 | Roth | |
| 5,325,421 A | 6/1994 | Hou et al. | |
| 5,493,608 A | 2/1996 | O'Sullivan | |
| 5,524,139 A | 6/1996 | Jones | |
| 5,638,436 A * | 6/1997 | Hamilton et al. | ........... 379/351 |
| 6,094,476 A * | 7/2000 | Hunt et al. | ............. 379/88.04 |
| 6,198,947 B1 | 3/2001 | Barber | ........................ 455/563 |
| 6,212,408 B1 * | 4/2001 | Son et al. | .................... 455/563 |
| 6,259,931 B1 * | 7/2001 | Singh | ....................... 455/553.1 |
| 2001/0047263 A1 * | 11/2001 | Smith et al. | ................ 704/275 |

* cited by examiner

*Primary Examiner*—Fan Tsang
*Assistant Examiner*—Olisa Anwah
(74) *Attorney, Agent, or Firm*—Thomas, Kayden, Horstemeyer & Risley LLP (57) ABSTRACT

An integrated telephone user interface (TUI) system permitting switching between Dual Tone Multi-Frequency and voice operating command modes. This system provides the user with access to either command mode and allows the user to toggle among the two command modes while each command mode remains functionally distinct from the other. For example, when receiving a call, the TUI prompts the user to select either the voice-based or the tone-based command mode. After receiving an input from the user that activates one of the command modes, the user may initiate a desired TUI operation while in the active command mode. However, the user can also interrupt the active command mode and switch to another operationally distinct command mode. In response to the interruption, the system translates command modes to allow the user to resume TUI operation in the other command mode.

36 Claims, 6 Drawing Sheets

INTEGRATED TONE-BASED AND VOICE-BASED TELEPHONE USER INTERFACE

FIELD OF THE INVENTION

The present invention relates to the field of telecommunications. This invention more particularly pertains to a telephone user interface (TUI) capable of switching between or among different command modes, such as Dual Tone Multi-Frequency (DTMF) and voice-based command modes.

BACKGROUND OF THE INVENTION

A TUI is a computer-implemented interface that allows a user to program and to manipulate program commands by using a telephone handset to communicate with a computer. At present, there are primarily two types of TUIs available: DTMF/tone-based and voice-based. In a tone-based TUI, control commands are generated using normal touch-tone dialing. For example, a user can touch buttons on a keypad to generate DTMF signals. Conventional telephones have a keypad including 12 buttons and, therefore, 12 possible combinations of tones. In contrast, for a voice-based TUI, commands are generated by reciting words or phrases. Voice activated controls recognize the recited words or phrases and identify the command.

A tone-based TUI provides a hierarchy of prompts consisting of a menu of options selected by touch-tone dialing. Once the TUI has been activated, the user is provided with an announcement of the options available at the present level in the menu structure. A TUI utilizing a DTMF interface instructs the user to press a keypad button associated with a number in order to initiate a desired action.

For example, a typical announcement in a DTMF-controlled TUI may provide the following menu of options for a voice mail system: "To listen to your messages, press 1; To change your voice mail greeting, press 2; . . . To disconnect, press 9." If the user presses a button represented by the number 1, the voice mail system plays the first voice mail message in the mailbox. This is an example of a single level of options in a tree menu structure. However, if the user presses a button represented by the number 2, the system goes to a different level of options in the tree menu structure. At each subsequent level the user enters, a new announcement is heard by the user. Each announcement instructs the user of a new set of available options. The user cannot skip levels of command options as a result of the tree-like menu structure for the DTMF-controlled interface. The user has to navigate through each level until a desired option is encountered, thereby making this tone-based TUI tedious to navigate.

On the other hand, a voice-based TUI utilizes a "flat" menu structure of options. Instead of pressing keys on the keypad of a telephone handset, the user states a voice command that instructs the system to perform an action. For instance, a user would simply state "Listen to my messages" or "Send a new message" without listening to a prompt identifying all of the possible options available to the user. In other words, upon the user entering the voice-based TUI, no announcement is made by the system and the user simply states the desired option, if known. If the user is not sure what to do, the user can say "Help" and the system responds by presenting the user with a list of the system's voice commands. However, because a voice-based TUI uses a flat menu structure, the user will not be provided with the hierarchy of prompts typically encountered in the tone-based TUI.

A voice-based TUI sometimes has difficulty responding to voice commands in noisy environments. Moreover, in public, if a user encounters a voice-based TUI, additional confidentiality may be desired. For example, the user may experience difficulty responding verbally in an environment where it is possible to be overheard. In order to allow the user to respond in private, the voice-based TUI must be exited or the user may simply fail to complete the purpose for which the call was made.

One technique to overcome the problems associated with both the DTMF and voice interface techniques is to utilize a voice-based TUI that can also accept the entry of DTMF commands. This technique is referred to as a voice-based hybrid TUI. Unlike a tone-based TUI, the user is not prompted in the voice-based hybrid TUI to press a button on a keypad to select an option. The user, however, must either know the corresponding button for a voice command or must ask the system for help.

Another technique to overcome the problems associated with both the tone-based and voice-based interface techniques is to utilize a tone-based TUI with integrated voice recognition. This technique is referred to as a tone-based hybrid TUI. An example of an announcement in a tone-based-hybrid TUI may state: "To listen to your messages, press or say 1 now; To change your voice mail greeting, press or say 2 now; To disconnect, press or say 9 now."

Both hybrid TUIs are implemented by using the same command mode of the core TUI on which they are based. For example, the tone-based hybrid TUI utilizes a tone-based command mode and the voice-based options are implemented from the core tone-based command mode. In contrast, the voice-based hybrid TUI uses a voice-based command mode and the tone-based options are performed while operating in this voice-based command mode. These known hybrid systems face operational difficulties because the options of a subsequently desired operating mode are implemented from within the originally initiated operating mode. For example, a tone-based hybrid TUI for a voice mail system may have a "Barge-In" capability that allows a user to implement voice command options without leaving the tone-based command mode. The user simply "talks over" the prompts and, in response, the tone-based-hybrid TUI recognizes the voice command and implements the corresponding option of the tone command mode. However, a Barge-In feature only allows the user to operate within the original command mode. To activate the other command mode, the user has to terminate the call and begin anew. There is no mechanism for changing the active command mode in a prior TUI system at any time during a call.

For the foregoing reasons, there is a need for a single TUI that combines tone-based and voice-based command modes. This integrated TUI should provide the user with access to either command mode and allow the user to switch between the two at anytime. This tone-based/voice-based TUI also should allow both modes to remain functionally distinct rather than having one command mode functioning as the core TUI.

SUMMARY OF THE INVENTION

The present invention solves the above-described problems in the prior art by providing a method and apparatus for switching between voice and tone-based command modes of a telephone user interface (TUI). The present invention can satisfy the need to integrate both tone-based and voice-based TUIs into a combined user interface technology that keeps both command modes distinct, while capitalizing on the individual benefits of both modes. The present invention can toggle between voice-based and tone-based command modes by mapping the operations of each command mode. This integrated TUI allows users to enter command signals with either voice or DTMF commands to transition between command modes at any time during a call to the TUI system.

Generally described, the present invention operates within an environment of a TUI having two or more different command modes. For example, the TUI includes a (1) tone-based command mode for receiving a command signal associated with a tone option of a menu structure of tone options and a (2) voice-based command mode for receiving a command signal associated with a voice option of a menu structure of voice options. The tone options are logically associated with the voice options as a result of a mapping operation. In response to a telephone call into the TUI, an initial command signal is generated, typically by a user inputting a tone or voice command or in response to a programmed trigger event. In response, a first command mode associated with the command signal is activated for operation by the TUI. This first command mode can be either the tone-based command mode or the voice-based command mode. The first command mode can be interrupted in response to receiving a subsequent command signal to activate a second command mode for operation by the TUI. The subsequent command mode signal also terminates the operation of the first command mode by the TUI. For example, the second command mode is set to the voice-based command mode when the first command mode is the tone-based command mode. Alternatively, the second command mode is set to the tone command mode when the first command mode is the voice command mode.

In one aspect of the present invention, the voice-based and tone-based command modes have an active or inactive status. Voice command options, which are typically represented by a flat menu structure, are logically associated with tone command options organized in a multi-level menu structure. A command mode switch, functionally connected to the voice-based and tone-based command modes, is responsive to command signals input by a user for switching between the command modes. The switch toggles among the command modes by (1) switching an active command mode to inactive status and by (2) switching the remaining command mode from inactive status to active status. In response to a switch toggle, the options in the newly active command mode are translated to the logically associated options of the previously active command mode. Significantly, either command mode is separately accessible at anytime by the user while the TUI operates in the present command mode.

More particularly described, the command options of the voice-based system and the tone-based system can be mapped to one another to permit an exchange between the command modes. While in one of the command modes, the user has access to the corresponding options of the other command mode. The translations can occur by inspecting a command signal input as a response in one command mode and then locating the option corresponding to the command signal for the other command mode. This translation is typically completed in accordance with a command mode option layout, which is typically maintained in a database.

A TUI constructed in accordance with the present invention has a number of advantages over prior tone-based and voice based interfaces. An important advantage of the inventive TUI is a feature that allows a user to toggle between or among the command modes, while maintaining distinct operational command modes. Accordingly, this invention overcomes the aforementioned inadequacies of the prior art and provides an improvement which is a significant contribution to the advancement of the telephone user interface art.

The foregoing has broadly outlined some of the more pertinent aspects and features of the present invention. These should be construed to be merely illustrative of some of the more prominent features and application of the invention. Other beneficial results can be obtained by applying the disclosed invention in a different manner or by modifying the disclosed embodiments. Accordingly, other aspects and a more comprehensive understanding of the invention may be obtained by referring to the detailed description of the exemplary embodiment taken in conjunction with the accompanying drawings, in addition to the scope of the invention defined by the claims.

BRIEF DESCRIPTION OF THE DRAWINGS

For a more succinct understanding of the nature and objects of the present invention, reference should be directed to the following detailed description taken in conjunction with the accompanying drawings in which.

DETAILED DESCRIPTION OF EXEMPLARY EMBODIMENTS

The present invention permits switching between distinct operating command modes of a telephone user interface (TUI) through a command translation process. In response to switching from one command mode of the TUI to another command mode, the user is able to resume operation in the newly selected command mode without having to exit the TUI during a call to the TUI-supported system. Although the present invention may be utilized in a variety of applications, the operation and feasibility of the present invention will be demonstrated by describing specific embodiments. One embodiment of the present invention is a TUI operating on a network node within the Public Switched Telephone Network (PSTN) or within a private telephone system. Another exemplary embodiment of the present invention is an implementation within a personal computer-based application which interfaces with a public or private telephone system. Alternate exemplary embodiments of the present invention can exist on a computer-readable medium or in a telephone answering system or a personal answering machine.

General Operation

A TUI embodying the principles of the present invention typically includes a voice-based command mode and a tone-based command mode. The TUI toggles or switches between two (or more) command modes. Each command mode can be set to either an active status or an inactive status. While the preferred embodiment is described with reference to a pair of command modes, it is understood that more than a pair of command modes may be used in the TUI of the present invention.

The tone-based command mode typically has a tree-like, multi-level menu that allows the user to select command options from the menu by pushing a button or key on a keypad. The menu in the tone-based command mode leads the user through the available command options. In comparison, the voice-based command mode has a flat menu structure that allows the user to state a voice command for performing an action. When set to an active status, each of the command modes can independently receive a command signal. The tone-based command mode receives tone-based command signals and the voice-based command mode receives voice command signals. For example, a dual tone multiple frequency (DTMF) recognition unit can be used to detect and recognize tonal commands, whereas a voice processing unit can be used for detecting and analyzing voice commands.

The present invention can include a command mode switch that is functionally connected to the voice-based and tone-based command modes. In response to toggling the command mode switch, the inactive command mode enters the active state and the formerly active command mode enters the inactive state. This translates the command option of the former active command mode to a corresponding command option of the newly active command mode. The command mode switch can control the operating states of the command modes of the TUI. The command mode switch typically includes a software module, a hardware module or a combination of both modules, and is responsive to command signals input by the user.

Figure 1:
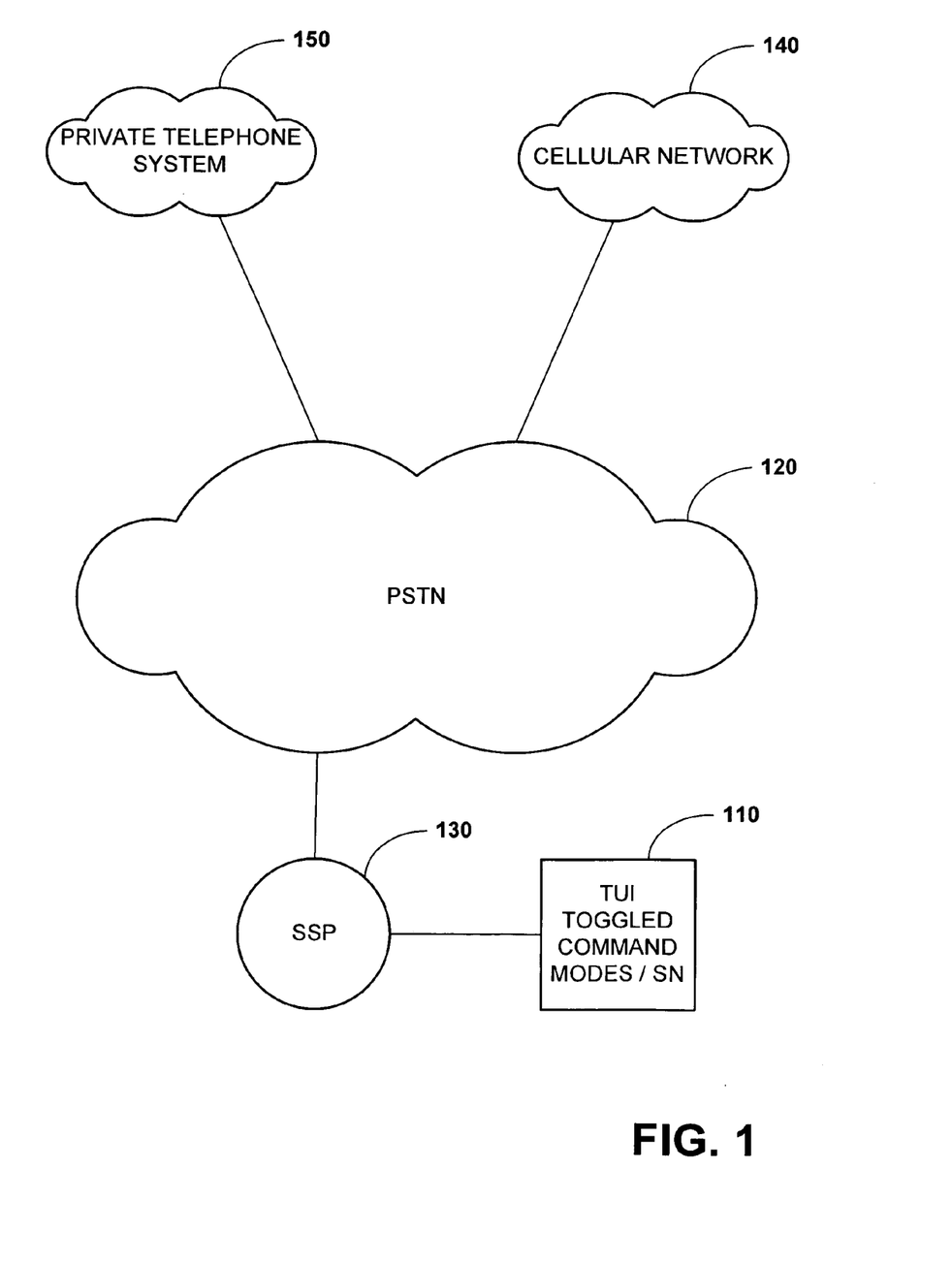
FIG. 1 illustrates an exemplary embodiment of the present invention operating within the environment of a public switched telephone network (PSTN)

FIG. 1 is a diagram depicting an exemplary embodiment of the present invention operating as an integral TUI with toggled command modes. In this embodiment, a service node (SN) 110 is connected to the PSTN 120 through a service switching point (SSP) 130. The SN 110 serves as the platform for a telephony system utilizing the TUI. The PSTN 120 interfaces to other telecommunication systems, such as cellular network 140 and private telephone systems 150.

Figure 2:
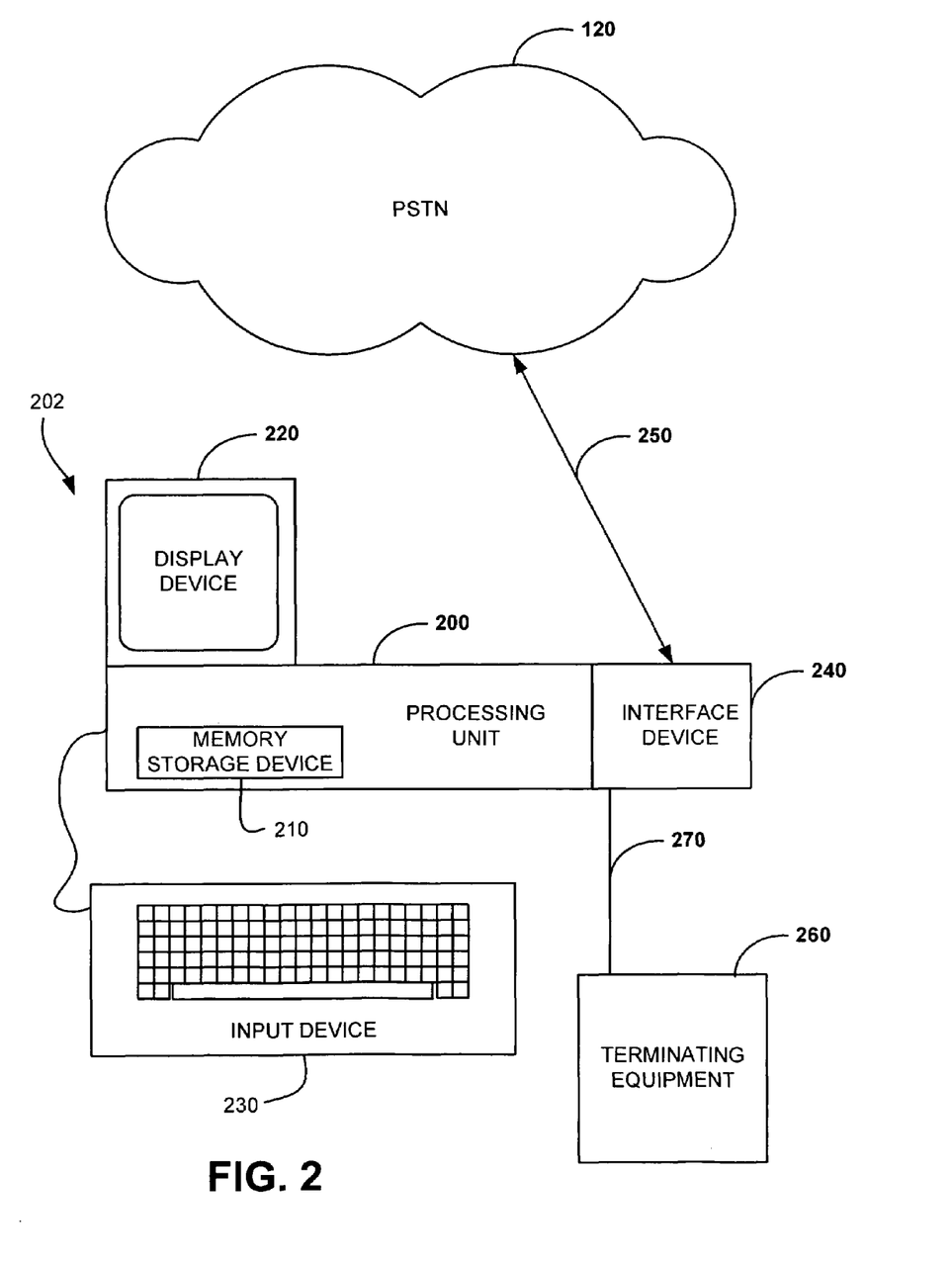
FIG. 2 illustrates another exemplary embodiment of the present invention operating within the environment of a personal computer interfacing with a PSTN.

Another exemplary embodiment of the present invention is illustrated in FIG. 2 in which a conventional personal computer operates as the platform for a TUI program. Although the configuration described herein is applicable to a variety of general purpose TUI programs to which the present invention may be incorporated, a specific embodiment comprising a toggled command mode, TUI computer program will be described as a representative example. The TUI computer program operates to toggle between distinct command modes for operating the TUI in response to receiving calls via the PSTN. The toggling of command modes is initiated in response to receiving an input signal representing a command from the calling party, i.e., a user. This interrupts the active command mode and thereafter activating the formerly inactive command mode. Once the alternative command mode is implemented, the user can continue operation of the TUI in this other command mode. This exemplary embodiment can toggle again between the command modes in response to receipt of subsequent input signals.

A computer 202 of FIG. 2 generally consists of a processing unit 200, which interfaces to a memory storage device 210, a display device 220 and a user input device 230. Access to the PSTN 120 is provided through an interface device 240. The interface device 240 supports at least one access line 250 connecting the computer 202 to the PSTN 120. The access line 250 may consist of analog or digital interfaces, and supports the process of receiving and transmitting analog or digital data in real-time or otherwise. In addition, a local terminating device 260 may be connected to the PSTN 120, via the computer 202, through a local line 270 and interface device 240.

The memory storage device 210 is operative to store a program module for implementing an exemplary embodiment of the TUI. For example, a TUI, implemented as a computer program running on the computer 202, provides an interface to a user via the display device 220. This interface emulates the physical interface of a standard telephone. In general, the TUI program module can process a call placed by a user via the PSTN 120 and transported over the access line 250 into the interface device 240.

The processing unit 200, being responsive to instructions of the TUI program module, can prompt the user for an initial command mode selection signal in response to a received call. The processing unit 200 activates a first command mode of the TUI based on the initial command mode selection signal. This first command mode can be interrupted in response to receiving a subsequent command mode selection signal to implement another command mode of the TUI. In response to interrupting the first command mode, the processing unit 200 activates the second command mode associated with the subsequent command mode selection signal and resumes TUI operation based on the second command mode. The processing unit 200 may then interrupt the second command mode in response to receiving yet another command mode selection signal to re-implement the first command mode. In turn, the processing unit 200 re-activates the first command mode while placing the formerly active second command mode into an inactive state.

The foregoing exemplary embodiment of the TUI may be conveniently implemented in one or more program modules as well as hardware components. The present invention may conveniently be implemented in a programming language such as the "C" programming language; however, no particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers, computer platforms and program modules that can be used to practice the present invention, it is not practical to provide a representative example of a computer program that would be applicable to these many different systems. Each user of a particular platform would be aware of the language and tools which are more useful for that user's needs and purposes to implement the instant invention.

Operation within the PSTN

Figure 3:
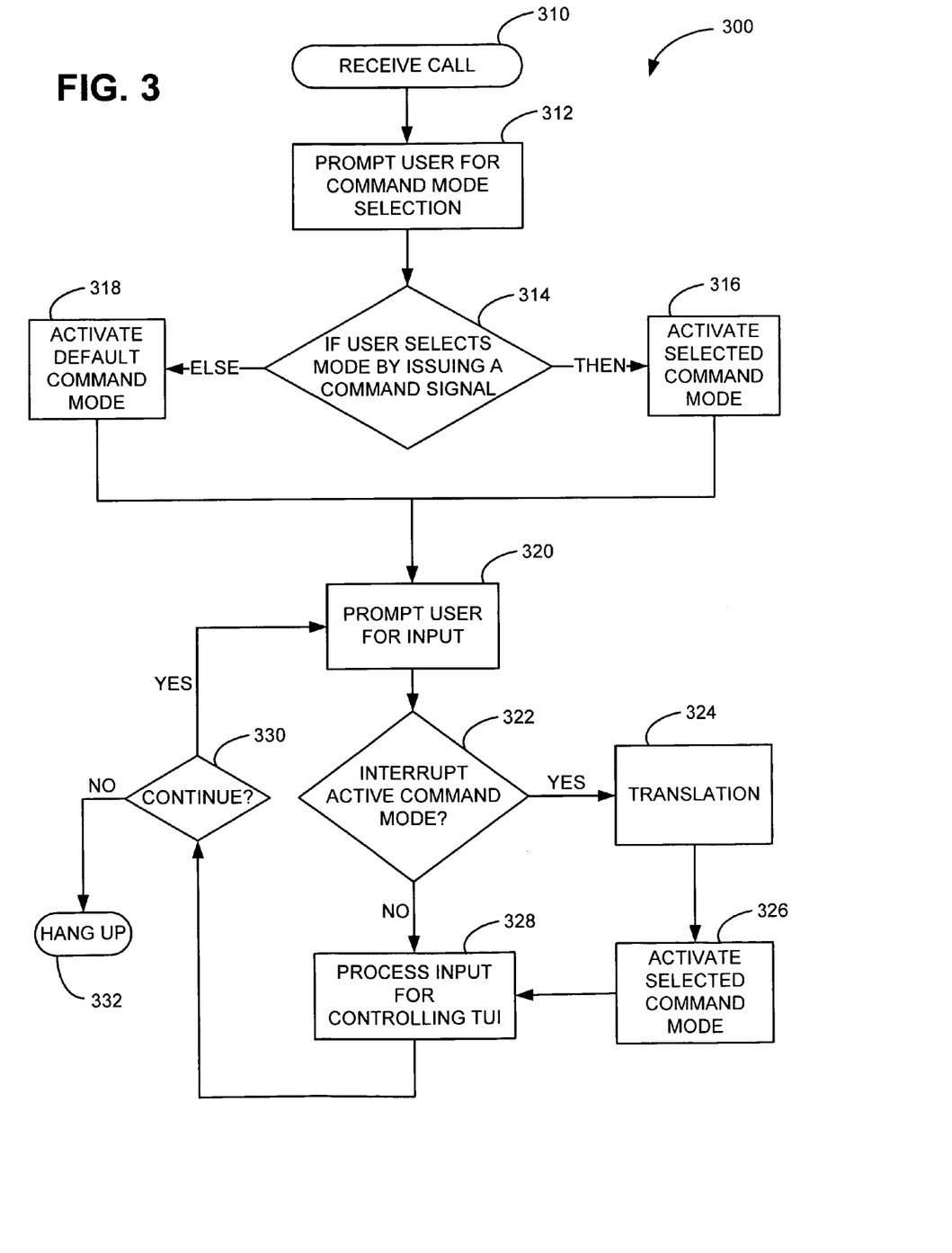
FIG. 3 is a flowchart of a method of toggling between command modes according to an exemplary embodiment of the present invention.

FIG. 3 illustrates a flow chart of a method 300 for switching between multiple command modes, such as a tone-based command mode or a voice-based command mode, of a TUI in accordance with an exemplary embodiment of the present invention. This method 300 is invoked by a call placed by a user to the TUI or, alternatively, a call could be placed to the user. The TUI itself is configurable for each particular customer. For example, a default mode can be set when the subscriber is initialized, when the subscriber calls and is prompted, or when the subscriber receives a call.

In the embodiment shown in FIG. 3, the TUI receives the call from the user as shown at block 310. Process block 312 is entered to prompt selection of either the tone-based command mode or the voice-based command mode. Preferably, the user is prompted a defined number of times, after which the process proceeds directly to the preferred command mode. Alternatively, the previously selected command mode is activated each time the user makes a call. For another embodiment, the command mode can be entered at process block 312 in response to the occurrence of a trigger event defined by program parameters of the TUI.

Still referring to FIG. 3, an inquiry is conducted at decision block 314 to determine whether the user has issued a command signal. In response to receiving a command signal, the THEN branch is followed to process block 316, where either the tone-based command mode or the voice-based command mode is activated. The selected command mode is associated with the initial command signal that serves to activate the first command mode. If the user fails to select a command mode in block 314, the ELSE block is followed to process block 318, where either the tone-based command mode or the voice-based command mode is activated as the default command mode. In some instances, as described above for example, blocks 312 and 314 could be skipped and the process would then proceed directly to block 318 to activate a predetermined default command mode.

The service provider preferably establishes one of the command modes as the default command mode. For instance, the tone-based command mode could be assigned as the default command mode during certain hours or in response to receiving a call from a particular telephone number into the TUI-supported system. If the tone-based command mode is the default command mode, an audio announcement of options available at a first command option level is made. If the voice command mode is the default command mode, no audio announcement is made. However, the user can be prompted for input in the voice-based command mode by providing a pause indicating the TUI is awaiting input from the user. The TUI may use voice recognition of predefined command terms in order to select the desired option. It will be appreciated that the TUI can provide alternative forms of input prompts, such as a verbal request or a tone that prompts the user for input.

From either block 316 or block 318, the method 300 continues to process block 320, where the user is prompted for input for the current active command mode, i.e., the selected command mode or the default command mode, respectively. At this point, the user is able to control the TUI by providing the appropriate command signals. In response to an input prompt, the user can choose at least one option from a menu of command options for the current active command mode. To control the TUI in the active command mode, the user inputs either tone-based command signals or voice-based command signals depending upon the active command mode. The input can involve DTMF or vocalized command signals received from a telephone handset.

In decision block 322, an inquiry is conducted to determine whether the active command mode should be interrupted. The inquiry undertaken in block 322 is shown in the flow chart of FIG. 4, and is explained in further detail below. In decision block 322, if the user interrupts the active command mode by inputting a command signal to change command modes, the YES branch is followed to process block 324 for translation of the command signal. The translation process is shown in FIG. 5 and is described in further detail below.

Figure 5:
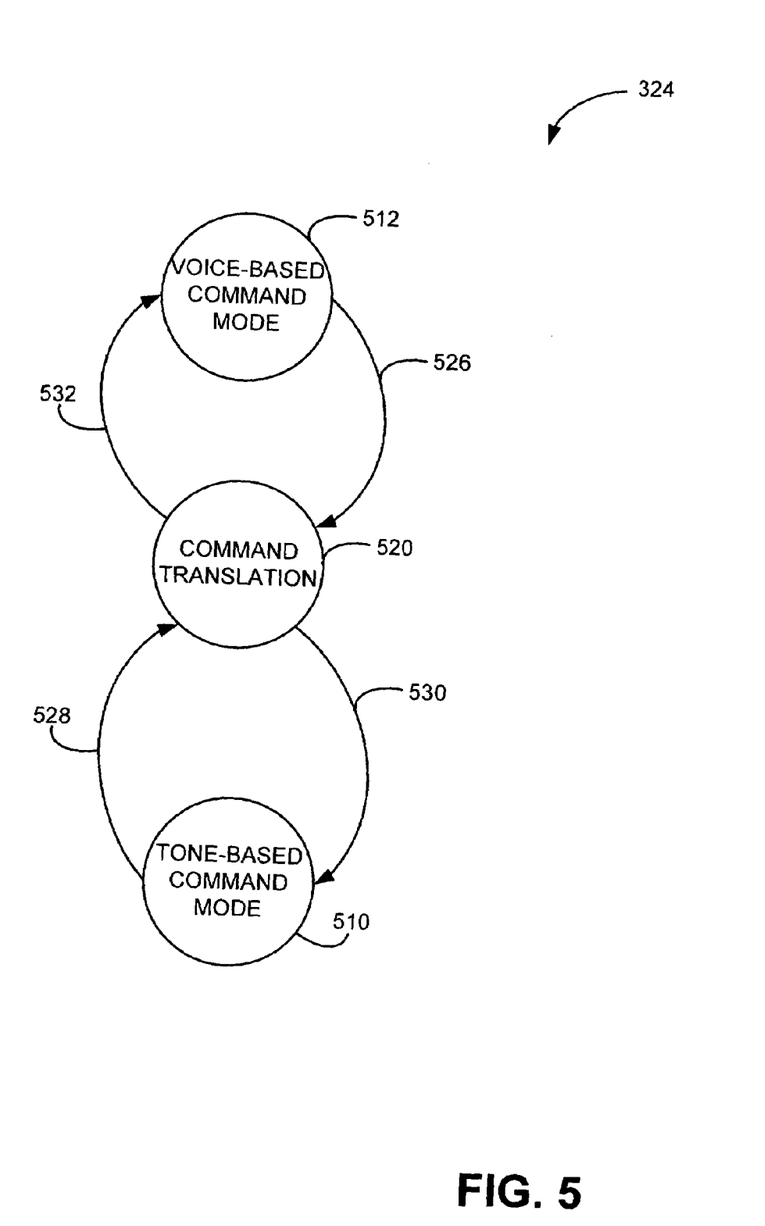
FIG. 5 is a state diagram illustrating the general operation of an exemplary embodiment of the present invention.
Figure 6:
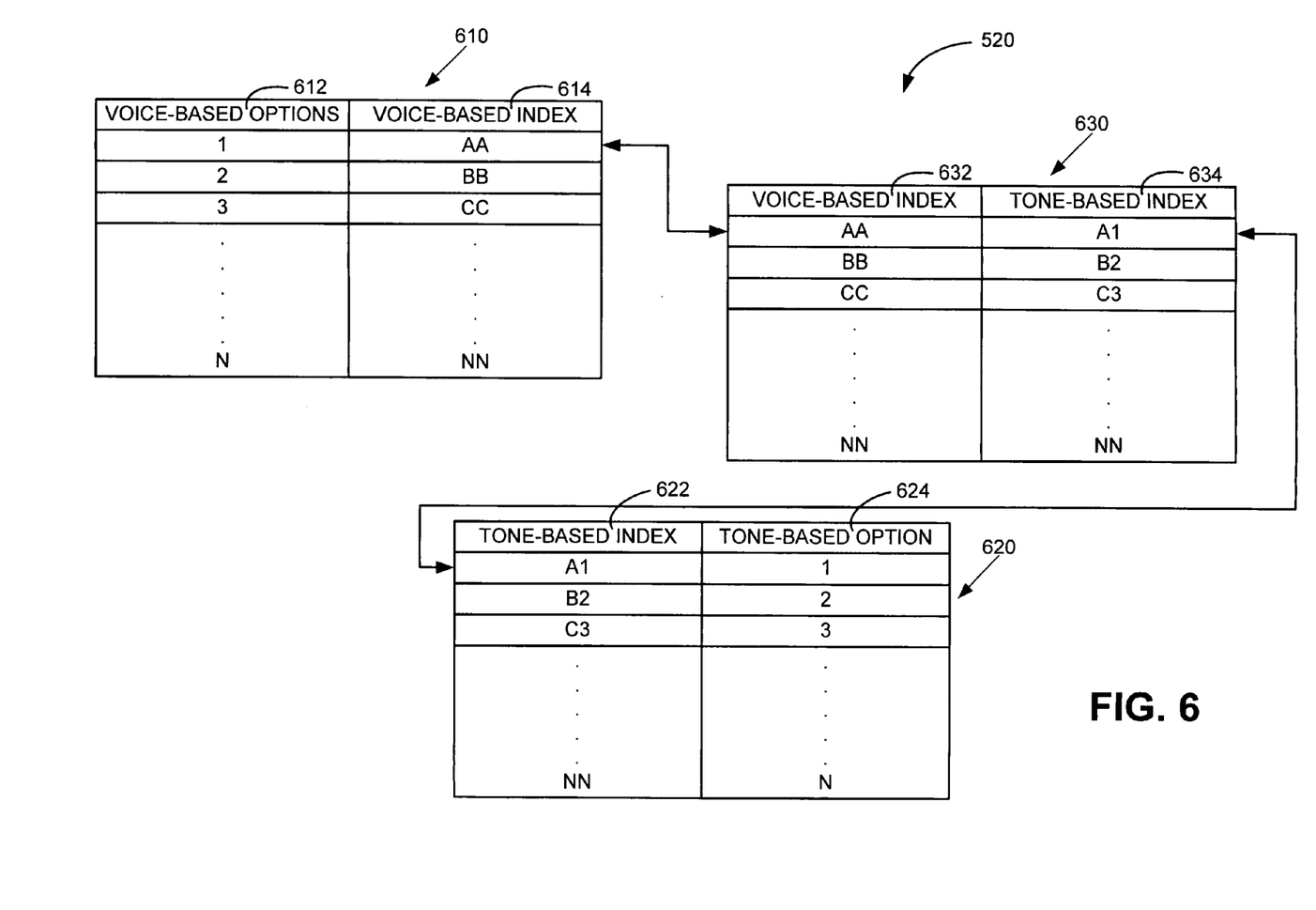
FIG. 6 illustrates an exemplary embodiment of a database containing tables of indexed options for voice-based and tone-based command modes.

During the translation task, the command signal is inspected at step 324 and the user is prompted with a command option for the other command mode. This command option corresponds to a command option of the interrupted command mode. Typically, the command option of the alternate command mode is located in accordance with a command option layout maintained in a database and defining the relationships between command options of the command modes. A typical database of the present invention is shown in FIG. 6, and is explained in further detail below.

At process block 326, the other command mode, namely the command mode associated with the command signal for interrupting the current command mode, is activated. At process block 328, input entered by the user for controlling the TUI and for completing the desired transaction is processed.

In block 322, if the user does not enter a command signal for changing command modes, the NO branch is followed directly to process block 328 for processing of the input entered by the user. The process continues to block 330, where an inquiry is conducted to determine whether to continue TUI operations. If so, the YES branch is followed to block 320. Otherwise, once all options desired by the user are executed, and if the user no longer desires to continue TUI operations, the NO branch is followed to block 332, where the user terminates the call and the TUI is exited.

In the event the process is interrupted again at block 322, after a second command mode has been activated in place of the first command mode, the second command mode may also be interrupted. For example, the first command mode can be activated again in response to receiving a command signal from the user directing the toggling of command modes.

Figure 4:
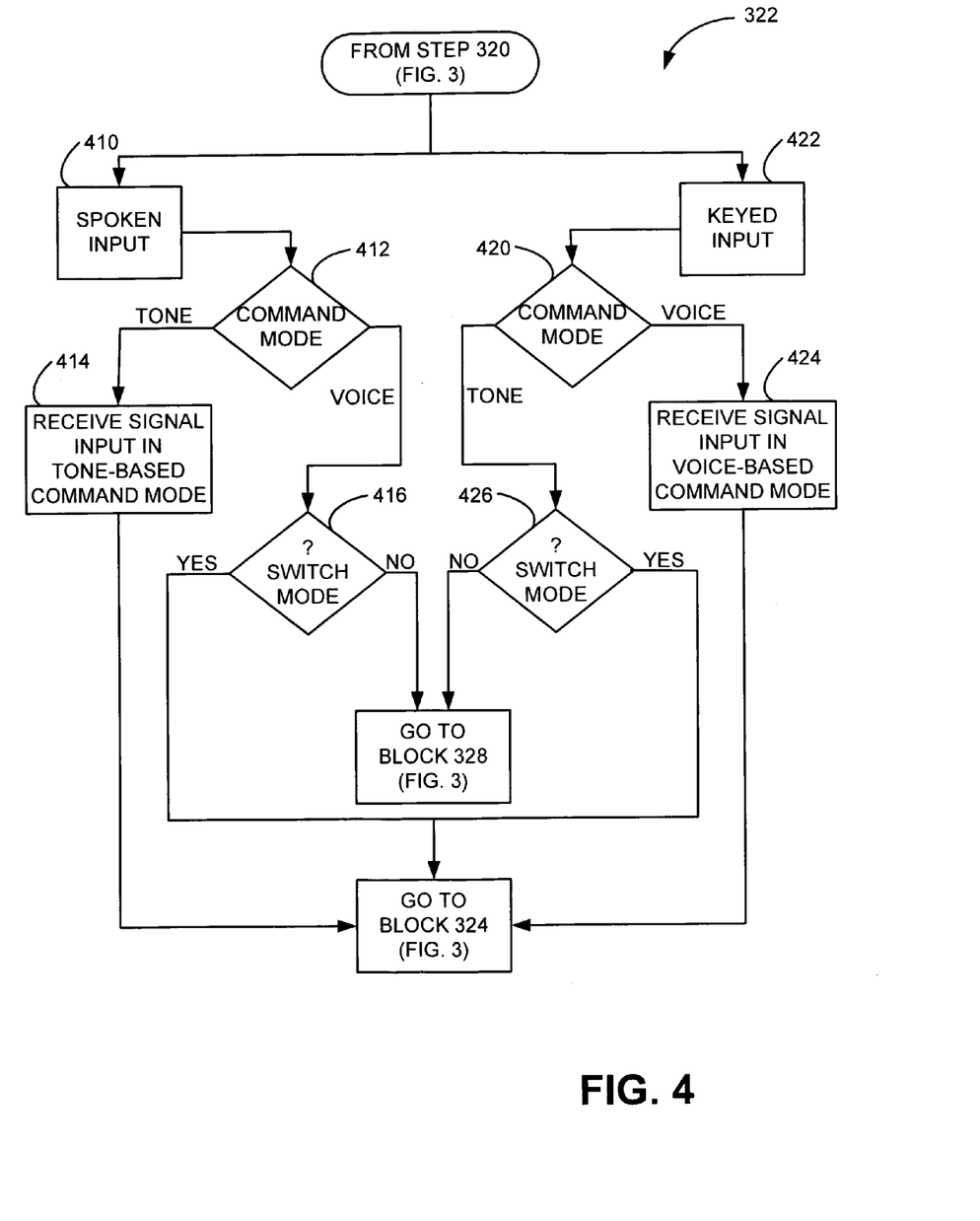
FIG. 4 is a flowchart of an interruption task completed according to an exemplary embodiment of the present invention.

The inquiry undertaken in block 322 is shown in more detail with respect to FIG. 4. As shown in this exemplary embodiment, to interrupt an active command mode, the user enters an input that is associated with the inactive command mode. For example, spoken input, as shown in process block 410, is entered by the user while in either the tone-based or the voice-based command mode. In decision block 412, an inquiry is conducted to determine which command mode is active. In decision block 412, if the active command mode is the tone-based command mode, the TONE branch is followed to process block 414, where the command signal in the form of spoken input is received. The process will then continue to block 324 (FIG. 3), where the spoken input is correlated with an option available in the voice command mode. For example, if in response to an announcement in the tone-based command mode, such as "To listen to your messages, Press 1" the user instead said "Listen to Messages", the user's verbal response would be recognized as a vocalized command and the option corresponding with this command in the voice-based command mode would be located. The voice-based command mode is then activated as shown in block 326 (FIG. 3). Proceeding to block 328 (FIG. 3), the option associated with the "Listen to Messages" input signal then can be executed by the voice-based command mode.

In block 412, if the user is in the voice-based command mode when entering a spoken entry, the VOICE branch is followed to decision block 416. In decision block 416, an inquiry is conducted to determine whether the voice-based command mode is to be switched to the tone-based command mode. If the user desires to switch from the voice-based command mode to the tone-based command mode, the user inputs a particular vocalized command, such as "Switch Mode". The YES branch is then followed to block 324 (FIG. 3). At block 324, the next available option in the voice-based command mode is correlated with a similar option available in the tone-based command mode. This option in the alternative command mode corresponds to an option in the interrupted command mode. Alternatively, a default operation results in response to a selection of an option at the beginning of the newly implemented command mode. Next, the process continues at process block 326 (FIG. 3), where the tone-based command mode is activated. At block 328 (FIG. 3), the user's input is processed in the tone-based command mode. In decision block 416, if the user does not desire to switch to the tone-based command mode, the NO branch is followed to block 328 (FIG. 3) for controlling TUI operation in the voice-based command mode.

Keyed input is entered at process block 422 in either the voice-based command mode or the tone-based command mode. In decision block 420, an inquiry is conducted to determine whether the TUI is operating in the voice-based command mode or the tone-based command mode. If the user enters keyed input in process block 422 when the TUI is operating in the voice-based command mode, then the process continues from block 420 along the VOICE branch to process block 424. In this manner, the tonal command mode selection signal is received while the TUI is operating in the voice-based command mode as shown in block 424.

For example, when the user enters tonal command signals while the voice-based command mode is active in block 420, the TUI interprets the conflicting command signal as an instruction to switch to the tone-based command mode. After receiving the keyed input in the voice-based command mode, the process continues to block 324 (FIG. 3), where the keyed entry entered at block 422 is correlated with an option available in the tone-based command mode. An option in the tree-like menu structure of the tone-based command mode is located which corresponds with the tonal command signal entered into the voice command mode. The method then proceeds to process block 326 (FIG. 3), where the tone-based command mode is activated. Once the tone-based command mode is activated, the process continues at block 328 (FIG. 3) to control the TUI utilizing the tone-based command mode.

In block 420, if the user enters keyed input when the command mode is set to the tone-based command mode, the process continues along the TONE branch to decision block 426. In decision block 426, an inquiry is conducted to determine whether the tone-based command mode should be switched to the voice-based command mode. In block 426, the user can switch from the tone-based command mode to the voice-based command mode by using pre-defined tonal command signals. The YES branch will then be followed to process block 324 (FIG. 3) for translation operations.

During translation, the position in the menu structure for the next available option in the tone-based command mode is correlated with a similar option available in the voice-based command mode. The position in the menu structure of the new command mode corresponds with the last position in the menu structure of the previous command mode. Alternatively, a default operation may require entry at the beginning of the menu structure for the newly implemented command mode. At process block 326 (FIG. 3), the voice command mode is activated. The process then continues to process block 328 (FIG. 3) to control the TUI while in the voice command mode. On the other hand, if the user does not desire to switch modes at decision block 426, the NO branch is followed to block 328 (FIG. 3) and the TUI remains in the tone-based command mode.

FIG. 5 is a state diagram illustrating the general operations completed by an exemplary embodiment of the present invention for toggling between a tone-base command mode 510 and a voice-based command mode 512. The command modes 510, 512 can be toggled through a command translation process using a command translation database 520. A typical embodiment of the command translation database 520 is shown in FIG. 6, and is explained in further detail below.

The command modes are integrally related with one another such that each is separately accessible at any time during a call by the user while the TUI is operating in the other command mode. After activating one command mode in place of another, the user is able to resume TUI operations in that newly selected mode without first exiting the TUI. In FIG. 5, the translation from the voice-based command mode 512 is initiated by a user providing an appropriate command signal 526 directing the changing of command modes. The translation from the tone-based command mode 510 is initiated by the user providing an appropriate command signal 528 directing the changing of command modes. Branches 530 and 532 illustrate the activation of the tone-based and voice-based command modes, respectively, after exiting the command translation database 520.

The options of the tone-based command mode 510 and the voice-based command mode 512 are mapped to one another to permit a command mode-to-command mode exchange. For example, while in one of the command modes, the user has access to the corresponding options of the other command mode by activating the other command mode while terminating the formerly active command mode. Using a mapping technique, the signal input for a command mode is inspected, and the option corresponding with that signal is located in the menu structure of the other command mode in accordance with a layout defined in the database 520. The location of the option to be executed, associated with the command signal to switch command modes, is retrieved during the command translation process from the database 520 and is used to identify the position in the menu structure of the new command mode.

In the exemplary embodiment shown in FIG. 6, the database 520 comprises tables 610, 620 and 630. Each of the tables have at least two items which correspond with each other. Table 610 includes a column 612 of voice-based options, for the voice-based command mode, marked in sequence from 1 to N and a column 614 of indices numbered in sequence from AA to NN. The voice-based options are associated with the voice-based index. Table 620 includes a column 622 of indices numbered in sequence from A1 to NN and a column 624 of tone-based options, for the tone-based command mode, numbered in sequence from 1 to N. Table 630 includes a column 632 of indices AA-NN and a column 634 of the indices A1–NN. In table 630, the voice-based index of the voice-based command mode is associated with the tone-based index of the tone-based command mode.

The options of each command mode are mapped to one another to permit command mode-to-command mode exchange. FIG. 6 shows a representative example for mapping a voice-based option of the voice-based command mode to a tone-based option of the tone-based command mode. In table 610, voice-based option 1 in column 612 is mapped to tone-based option 1 in column 624 of table 620 by mapping voice-based index AA to tone-based index A1 and then mapping tone-based index A1 to tone-based option 1. Translation from voice-based option 1 of column 612 to tone-based option 1 of column 624 occurs by inspecting a signal input in the voice-based command mode to implement the tone-based command mode. In response, the tone-based option corresponding to the input signal for the tone-based command mode is located in accordance with the layout shown in table 630. Once the tone-based option 1 is located in column 624 of table 620, the tone-based command mode is activated, in place of the voice-based command mode, thereby making the tone-based option 1 available to the user.

Once a subsequent command mode has been implemented, the user may return to a previously activated command mode. In other words, the user can toggle between command modes by interrupting one command mode in order to activate the other command mode. In this manner, the present invention permits any command mode to be interrupted an almost infinite number of times during a call placed to a TUI-supported system. However, the options may be mapped differently between one another when toggling between command modes. For example, the user may be mapped to the last initiated option in the menu structure of the activated command mode, to the option of the activated command mode which is most functionally similar to the last option accessed in the deactivated command mode, or to the first available option in the menu structure of the activated command mode.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A telephone user interface (TUI) configured to receive a command signal after a call is connected, the TUI comprising:
    voice-based command mode logic for receiving a voice-based command signal from a user in association with an option of a first menu structure of options, said voice-based command mode logic having an active status and an inactive status;
    tone-based command mode logic for receiving a tone-based command signal from the user in association with an option of a second menu structure of options, said tone-based command mode logic having an active status and an inactive status, said options of said first menu structure logically associated with said options of said second menu structure;
    mode determination logic configured to determine whether a received command signal correlates with the control mode logic that is currently associated with inactive status;
    translation logic configured to translate the received command signal into a format associated with the control mode logic that is currently associated with the active status, in response to the determination that the received command signal corresponds to the control mode logic that is currently associated with inactive status;
    toggle determination logic configured to, in response to the translation logic translating the control signal, determine whether to toggle the voice-based command mode logic and the tone-based command mode logic between active status and inactive status by providing a user prompt and receiving a user input to the user prompt; and
    switching logic configured to, in response to the toggle determination logic determining to toggle the voice-based command mode logic and the tone-based command mode logic between active and inactive status, toggle the voice-based command mode logic and tone-based command mode logic between active status and inactive status,
    wherein said active status of the tone-based command logic correlates with the inactive status of the voice-based command logic, and wherein the inactive status of the tone-based command logic correlates with the active status of the voice-based control logic.

2. The TUI of claim 1, wherein the translation logic is configured to translate a first received command signal from a voice-based protocol to a tone-based protocol.

3. The TUI of claim 1, wherein the translation logic is configured to translate a first received command signal from a tone-based protocol to a voice-based protocol.

4. The TUI of claim 1, wherein the TUI is situated at a central office.

5. The TUI of claim 1, wherein the options of the voice-based command mode logic and the tone-based command mode logic are mapped to one another to permit a command mode-to-command mode exchange.

6. The TUI of claim 1, wherein the TUI includes data storage logic configured to store first data related to the voice-based command mode logic, second data related to the tone-based command mode logic, and third data related to the voice-based command mode logic and the tone-based command mode logic, wherein the first data, second data, and third data correspond to a first table, a second table, and a third table, respectively.

7. The TUI of claim 6, wherein, the first table is associated a plurality of voice-based options and a plurality of indices, wherein the second table is associated with a plurality of indices and a plurality of tone-based options, and wherein the third table is associated with the plurality of indices related to the first table and a plurality of indices related to the second table.

8. The TUI of claim 7, wherein each of the first table, second table, and third table include at least two items that correspond with each other.

9. A telephone user interface (TUI) configured to receive a command signal after a call is connected, comprising:
    voice-based command mode logic configured to receive a vocalized command signal from a user in association with a voice option of a menu structure of voice options, said voice-based command mode logic having an active status and an inactive status;
    tone-based command mode logic configured to receive a tonal command signal from the user in association with a tone option of a menu structure of tone options, said tone-based command mode logic having an active status and an inactive status, said voice options logically associated with said tone options; and mode determination logic configured to determine whether the received command signal corresponds to the control mode logic that is currently associated with inactive status;

translation logic configured to translate the received first command signal into a format corresponding to the control mode logic that is currently associated with the active status, in response to the determination that the received first command signal corresponds to the control mode logic that is currently associated with inactive status;

toggle determination logic configured to, in response to the translation logic translating the control signal, determine whether to toggle the voice-based command mode logic and the tone-based command mode logic between active status and inactive status by providing a user prompt and receiving a user input to the user prompt; and switching logic configured to, in response to the toggle determination logic determining to toggle the voice-based command mode logic and the tone-based command mode logic between active status and inactive status, toggle the voice-based command mode logic and tone-based command mode logic between active status and inactive status.

10. The TUI of claim 9, wherein the translation logic is configured to translate the first received command signal from a voice-based protocol to a tone-based protocol.

11. The TUI of claim 9, wherein the translation logic is configured to translate the first received command signal from a tone-based protocol to a voice-based protocol.

12. The TUI of claim 9, wherein the switching logic is configured to remain idle in response to the determination logic determining that the second received command signal correlates to the command mode logic currently associated with active status.

13. The TUI of claim 9, wherein the TUI is situated at a central office.

14. A method in a telephone user interface (TUI) configured to receive a command signal after a call is connected, the TUI including a tone-based command mode having a menu structure of tone options and a voice-based command mode having a menu structure of voice options, wherein the tone-based command mode has an active status and an inactive status and the voice-based command mode has an active status and an inactive status, said method comprising the steps of:
  a. operating the TUI with a command mode that corresponds to active status;
  b. receiving a command signal from a user;
  c. determining whether the active command mode correlates to the command signal;
  d. in response to determining that the received command signal does not correlate with the active command mode, translating the received command signal into a format that corresponds to the active command mode;
  e. in response to translating the received command signal, determining whether to toggle the tone-based command mode and the voice-based command mode between active status and inactive status by providing a user prompt and receiving a user input to the user prompt; and
  f. in response to determining to toggle the tone-based command mode and the voice-based command mode between active status and inactive status, toggling the tone-based command mode and the voice-based command mode between active status and inactive status.

15. The method of claim 14, wherein the active command mode is associated with a default command mode.

16. The method of claim 15, wherein the default mode corresponds to the tone-based command mode.

17. The method of claim 15, wherein the default mode corresponds to the voice-based command mode.

18. The method of claim 14, wherein the active command mode is selected by a user.

19. The method of claim 14, wherein said command signal is a DTMF tonal command.

20. The method of claim 14, wherein said command signal is a voice command.

21. The method of claim 14, further comprising mapping the options of the first command mode and the second command mode to one another to permit a command mode-to-command mode exchange.

22. A method for controlling a telephone user interface (TUI), the TUI including a plurality of command modes, the method comprising:
  a. operating said TUI in a voice-based command mode;
  b. receiving a command signal from a user;
  c. determining whether the received command signal corresponds to the voice-based command mode;
  d. translating the received command signal to a format that corresponds to the voice-based command mode, in response to determining that the received command signal does not correspond with the voice-based command mode;
  e. in response to translating the received command signal to a format that corresponds to one of said command modes, determining whether to operate the TUI in a tone-based command mode that corresponds to a format associated with the received command signal by providing a user prompt and receiving a user input to the user prompt; and
  f. in response to determining to operate the TUI in the tone-based command mode, operating the TUI in the tone-based command mode that corresponds to a format associated with the received command signal.

23. The method of claim 22, further comprising operating the TUI in the tone-based command mode in response to activating said tone-based command mode.

24. The method of claim 22, further comprising the step of activating one of said command modes as a default command mode.

25. A method in an integrated computer telephony system providing a telephone user interface (TUI), said TUI having a pair of command modes, the method for toggling between said command modes, comprising the steps of:
  a. operating said TUI in a tone-based command mode;
  b. receiving a command signal from a user;
  c. determining whether the received command signal corresponds to the tone-based command mode;
  d. translating the received command signal to a format that corresponds to the tone-based command mode, in response to determining that the received command signal does not correspond with the tone-based command mode;
  e. in response to translating the received command signal to a format that corresponds to the tone-based command mode, determining whether to operate the TUI in a voice-based command mode that corresponds to a format associated with the received command signal for a subsequent command signal by providing a user prompt and receiving a user input to the user prompt; and f. in response to determining to operate the TUI in the voice-based command mode, operating the TUI in the voice-based command mode that corresponds to a format associated with the received command signal for a subsequent command signal.

26. The method of claim 25, further comprising the steps of receiving a subsequent command signal and activating said tone-based command mode in place of said voice-based command mode.

27. A method in a program module operating within a telecommunications system and having access to a TUI, said TUI having a pair of command modes for controlling said TUI and providing a plurality of options to be implemented through the telecommunications system, the method for controlling said command modes, comprising the steps of:
   implementing one of the said command modes to initially control said TUI;
   in response to a command signal issued by a user after a call is connected, translating the command signal into a format corresponding to the activated command mode;
   in response to translating the command signal into a format corresponding to the activated command mode, determining whether to toggle the command modes by providing a user prompt and receiving a user input to the user prompt, wherein said toggling is initiated by interrupting the operation of one of said command modes while one of said command modes is controlling said TUI, activating the other of said command modes, and resuming control of said TUI while in the other of said command modes for a subsequent command signal; and
   in response to determining to toggle said command modes, toggling said command modes, wherein the pair of command modes includes a tone-based command mode and a voice-based command mode.

28. The method of claim 27, wherein the tone-based command mode is initially controlling said TUI, said tone-based command mode is interrupted, and the voice-based command mode is activated in place of said tone-based command mode.

29. The method of claim 28, wherein said tone-based command mode is interrupted by transmitting voice command signals into said TUI.

30. The method of claim 27, wherein said voice-based command mode is interrupted and said tone-based command mode is activated to control said TUI in place of said voice-based command mode.

31. The method of claim 30, wherein said voice-based command mode is interrupted by transmitting tonal command signals into said TUI.

32. A computer system for toggling command modes of a telephone user interface (TUI) having a pair of command modes, the pair of command modes including a first command mode and a second command mode, said computer system comprising:
   a processing unit;
   a memory storage device operative to store a program implementing said TUI; and
   an interface device coupled to said processing unit for receiving a call,
   said processing unit responsive to instructions in said program and being operative to:
   prompt for a command signal after a call is connected;
   activate said first command mode associated with said command signal;
   control said TUI while in said first command mode;
   receive a subsequent command signal from a user, the subsequent command signal corresponding to a second command mode;
   translate the subsequent command signal into a format that corresponds to the first command mode;
   in response to translating the subsequent command signal into a format that corresponds to the first command mode, determine whether to interrupt said first command mode by providing a user prompt and receiving a user input to the user prompt;
   in response to determining to interrupt said first command mode, interrupt said first command mode; and
   resume operation of said TUI by utilizing said second command mode for a subsequent command signal,
   wherein the pair of command modes includes a tone-based command mode and a voice-based command mode.

33. The computer system of claim 32, wherein said tone-based command mode is interrupted by transmitting voice command signals into said TUI.

34. The computer system of claim 32, wherein said tone-based command mode is interrupted by transmitting voice command signals into said TUI.

35. The computer system of claim 32, wherein said processing unit is further operative to:
   interrupt said second command mode in response to receiving said command signal to activate said first command mode in place of said second command mode.

36. The computer system of claim 32, wherein said processing unit is further operative to:
   interrupt said first command mode in response to receiving said subsequent command signal to activate said second command mode in place of said first command mode.

* * * * *